F. BILLON.
ELASTIC COUPLING FOR ECCENTRIC SHAFTS.
APPLICATION FILED NOV. 10, 1917.

1,316,673.

Patented Sept. 23, 1919.

F. Billon.
Inventor.
By Albert Fasher
Attorney.

UNITED STATES PATENT OFFICE.

FRÉDÉRIC BILLON, OF SOLOTHURN, SWITZERLAND.

ELASTIC COUPLING FOR ECCENTRIC-SHAFTS.

1,316,673.   Specification of Letters Patent.   Patented Sept. 23, 1919.

Application filed November 10, 1917. Serial No. 201,382.

*To all whom it may concern:*

Be it known that I, FRÉDÉRIC BILLON, a citizen of the Swiss Republic, residing at Solothurn, Switzerland, have invented certain new and useful Improvements in Elastic Couplings for Eccentric-Shafts, of which the following is a specification.

For driving magneto-electric ignition apparatus, small dynamos and the like, spring couplings have hitherto been employed in which springs or bundles of springs have been used arranged diametrally in relation to the cross section of the shaft. Couplings of this construction can only be used when the two shafts to be coupled are mounted exactly centrally in relation to each other.

The present invention has for its object to provide an improved construction of spring couplings which are more particularly suitable for driving magneto-electric ignition apparatus, and have the great advantage that the two shafts to be coupled need no longer be mounted exactly centrally in relation to each other. With this object, the coupling is constructed to be elastic in all directions. This is achieved by employing a bundle of springs composed of springs arranged crosswise, instead of the elastic intermediate members hitherto employed consisting of a single bundle of springs arranged diametrally in relation to the cross section of the shaft. This improved form of elastic intermediate member allows of the two shafts shifting relatively to each other in all directions. The cross-shaped elastic intermediate member may be constructed by connecting together four bundles of springs having their ends bent at 90°, in such a manner that the adjacent ends of each two bundles form together one arm of the cross.

Several embodiments of this invention are illustrated by way of example in the accompanying drawings in which:—

Figure 1:
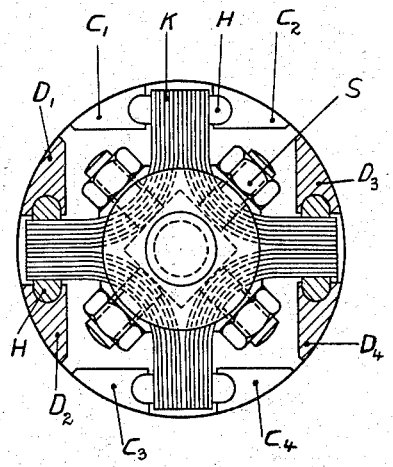
Figure 1 is a cross section at right angles to the axis.
Figure 2:
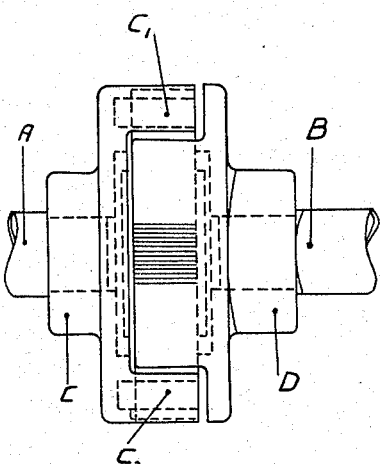
Fig. 2 is a side elevation of one form of the improved coupling.
Figure 3:
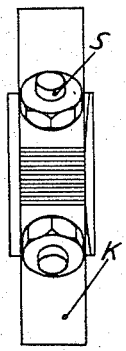
Fig. 3 is an end elevation of part of the coupling.

Referring to the embodiment shown in Figs. 1 and 2, in this form of the improved coupling the spring cross is formed by placing together four bundles of springs which have their ends bent at 90° to one another and are held together by bolts S. A and B are the ends of the shafts to be coupled together. On the shaft A there is mounted the half C of the coupling with the projections $C_1$ $C_2$ and $C_3$ $C_4$. On the shaft B there is mounted the half D of the coupling with the projections $D_1$ $D_2$ and $D_3$ $D_4$. K is the cross-shaped spring intermediate member which is inserted between the said projections of the two halves of the coupling. The member K is shown in end elevation in Fig. 3. H are pieces of fiber located between the spring intermediate member K and the projections C and D for the purpose of preventing wear and tear of these parts. Instead of fastening together the four bundles of springs by means of bolts S, they may be riveted together.

Figure 4:
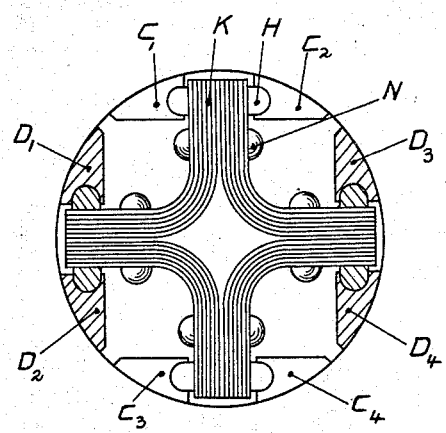
Fig. 4 is a cross section.
Figure 5:
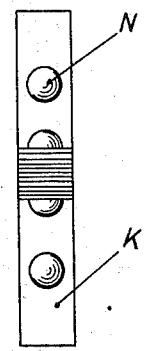
Fig. 5 is a side elevation of a modified form of the intermediate member.

In the modified form of the spring intermediate member of this type, shown in Figs. 4 and 5, the corresponding parts are marked with the same reference letters as in Figs. 1 and 2. In this case rivets N are employed instead of the bolts S in Fig. 1.

What I claim is:—

1. An elastic spring coupling for line shafts comprising members secured on the ends of contiguous shafts, overlapping projections on said members, recesses in said projections, a cross formed of bundles of spring plates, bent at right angles and secured in said recesses in said projections to form a resilient connection between the said shafts, substantially as described.

2. In elastic spring couplings comprising circular members secured on the ends of contiguous shafts, projections on the faces of said members, recesses in said projections, a cross formed of four bundles of spring plates of equal width, each bundle bent at right angles and secured together at their parallel faces by rivets, the extensions beyond said rivets engaging with fiber inserts placed in each face of the alternately arranged projections on the circular members, substantially as described.

In testimony whereof I have signed my name to this specification.

FRÉDÉRIC BILLON.